United States Patent
Livne et al.

(10) Patent No.: US 9,241,250 B2
(45) Date of Patent: Jan. 19, 2016

(54) SYSTEM AND METHOD TO SUPPORT MEDIATION OF OCS DIAMETER/RO REAUTHORIZATION ON GSM CAMEL NETWORKS

(71) Applicant: Oracle International Corporation, Redwood Shores, CA (US)

(72) Inventors: Shlomo Livne, Ra'Anana (IL); Vladimir Furman, Fair Lawn, NJ (US); Lior Harpaz, Redwood Shores, CA (US); Tzach Livyatan, Tel-Aviv (IL); Marina Bunin, Netanya (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 201 days.

(21) Appl. No.: 13/934,911

(22) Filed: Jul. 3, 2013

(65) Prior Publication Data
US 2015/0011181 A1    Jan. 8, 2015

(51) Int. Cl.
*H04W 4/24* (2009.01)
*H04W 12/08* (2009.01)

(52) U.S. Cl.
CPC .............. *H04W 4/24* (2013.01); *H04W 12/08* (2013.01)

(58) Field of Classification Search
USPC ......... 455/405, 406, 407, 408, 410–411, 415, 455/432.1, 432.3, 433, 439; 370/231–235, 370/253
See application file for complete search history.

(56) References Cited

U.S. PATENT DOCUMENTS

| | | | |
|---|---|---|---|
| 2004/0185828 A1* | 9/2004 | Engelhart | H04M 15/00 455/408 |
| 2007/0206748 A1* | 9/2007 | Cassanova | H04M 15/06 379/142.01 |
| 2009/0024502 A1* | 1/2009 | Xie et al. | 705/35 |
| 2009/0163172 A1* | 6/2009 | Tornkvist et al. | 455/406 |
| 2009/0253400 A1* | 10/2009 | Jayanna | H04M 3/42195 455/404.1 |
| 2010/0056099 A1* | 3/2010 | Kazmi | H04M 3/5116 455/404.1 |
| 2012/0157041 A1* | 6/2012 | Cai et al. | 455/406 |
| 2014/0329504 A1* | 11/2014 | Gupta | H04Q 3/0045 455/411 |

* cited by examiner

*Primary Examiner* — Dai A Phuong
(74) *Attorney, Agent, or Firm* — Tucker Ellis LLP

(57) ABSTRACT

Embodiments of the present invention provide a system and method which overcome the limitations of CAMEL systems which do not natively support reauthorization functionality. The system and method provide a mediation mechanism by which an online charging systems that supports reauthorization functionality can run using the mediation mechanism over CAMEL system. The mediation mechanism provides a means for added user credits to be utilized and allows the user to continue with the activity in which the user was engaged. This is advantageous both to the user and the service provider.

20 Claims, 6 Drawing Sheets

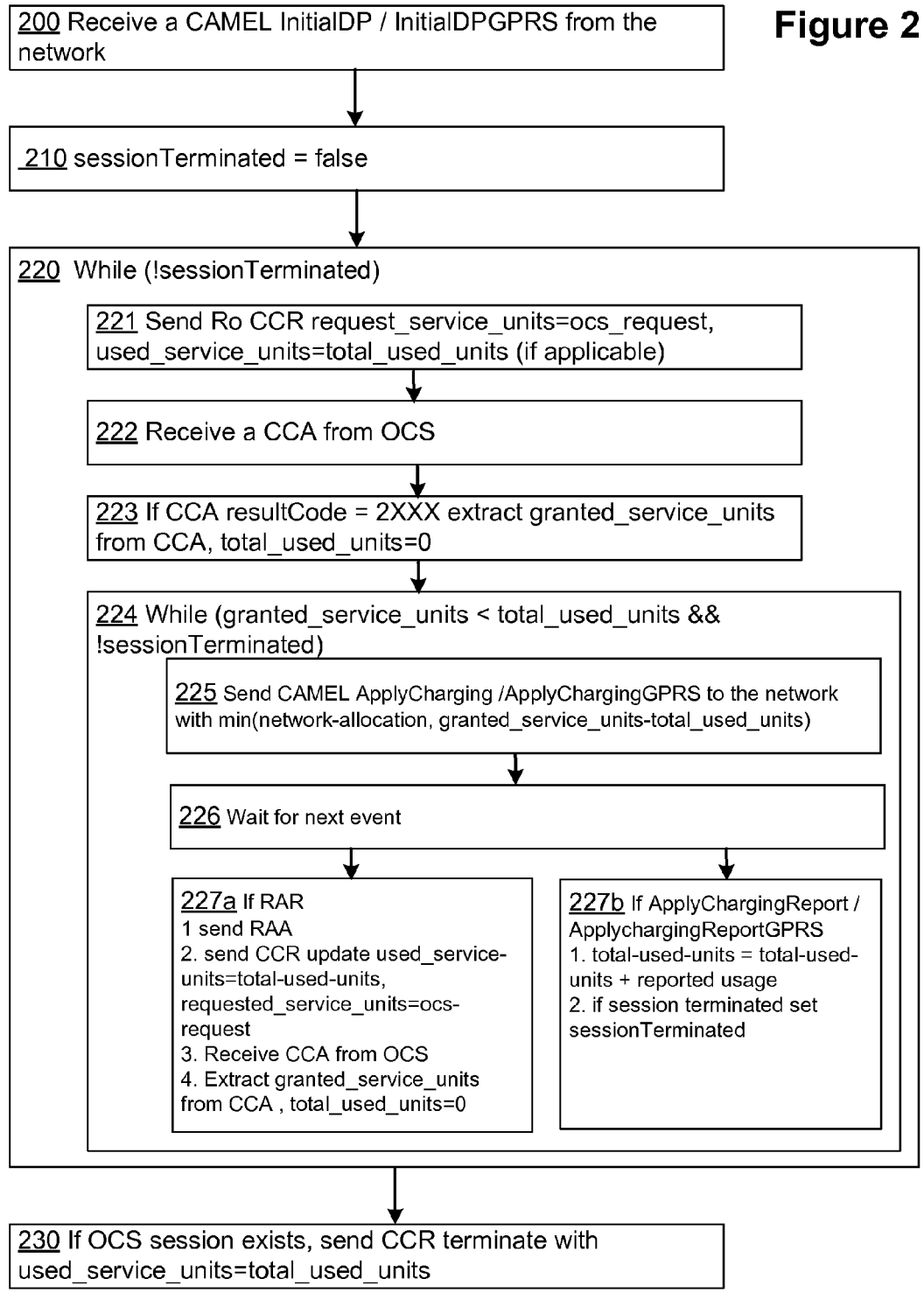

SYSTEM AND METHOD TO SUPPORT MEDIATION OF OCS DIAMETER/RO REAUTHORIZATION ON GSM CAMEL NETWORKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to charging in telecommunications networks and in particular to a system and method Diameter credit control redirection.

BACKGROUND

Customized Applications for Mobile networks Enhanced Logic, or CAMEL (ETSI TS 123 078) for short, is a set of standards designed to work on either a GSM core network or UMTS network. They allow an operator to define services over and above standard GSM services/UMTS services. Many services can be created using CAMEL, and it is particularly effective in allowing these services to be offered when a subscriber is roaming, like, for instance, no-prefix dialing (the number the user dials is the same no matter the country where the call is placed) or seamless MMS message access from abroad. CAMEL Application Part (CAP) portable software provides mechanisms to support operator services beyond the standard GSM services for subscribers roaming within or outside their home network. The CAP product extends the Intelligent Network framework to GSM/3G networks for implementing services. CAMEL is used when the subscriber is roaming between networks, allowing the home network to monitor and control calls made by the subscriber. CAMEL provides services such as prepaid roaming services, fraud control, special numbers (e.g., 123 for voicemail that works everywhere) and closed user groups (e.g., office extension numbers that work everywhere).

The Diameter Credit Control Application is specified in RFC 4006. It can be used to provide real-time credit control for various applications, including, for example, messaging services, gaming services, video services, etc. The Application is used between the network element providing the service (client) and a credit control server. Redirection of sessions is used by Diameter Credit Control Applications (DCCA-RFC 4006) as a means to redirect a user to a different destination to engage with additional services. This includes, for example redirection of prepaid users to a service for adding additional credit to a prepaid account in a top-up process. Redirection is a key enabler for advanced charging features such as On-The-Fly top-up.

Re-Authorization Request (RAR) and Re-Authorization Response (RAA) are defined in RFC3588 and are used in DCCA/Ro RFC4006 by the OCS to force a credit reauthorization by the network for example after a top-up operation. However, in CAMEL there is no means to request the Mobile Switching Center (MSC) to generate an ApplyChargingReport. Accordingly, following a top-up, notice of additional credit may never reach the service provider—this results in termination of the user session despite the presence of sufficient credit for use of the service. This is disadvantageous to the user because the user is unable to easily continue with the activity the user was engaged in. This is also disadvantageous to the service provider, because the user may choose not to consume further services.

It would therefore be desirable to provide a system and method which overcome the limitations of CAMEL systems which do not natively support reauthorization functionality.

SUMMARY

Embodiments of the present invention provide a system and method which overcome the limitations of CAMEL systems which does not natively support reauthorization functionality. The system and method provide a mediation mechanism by which an online charging systems that supports reauthorization functionality can run using the mediation mechanism over CAMEL system. The mediation mechanism provides a means for added user credits to be utilized and allows the user to continue with the activity in which the user was engaged. This is advantageous both to the user and the service provider.

In an embodiment of the invention an online mediation system includes a charging module to provide the added functionality to CAMEL systems. The SCIM/Service Broker uses the charging module to control ApplyCharging/ApplyChargingReports sent to the MSC and control CCR/CCA, RAR/RAA sent to the online charging system.

Embodiments of the invention provide a method to support executing External Charging over GSM Camel networks in which MSC accounting is used. Because OCS Re-Authorization is a key enabler for advanced charging features such as On-The-Fly top-ups, the present invention is advantageous in Converged Charging/On-line Charging/Pre-Paid Charging to allow online charging systems to run over common GSM CAMEL networks that do not natively support reauthorization.

Other objects and advantages of the present invention will become apparent to those skilled in the art from the following detailed description of the various embodiments, when read in light of the accompanying drawings.

BRIEF DESCRIPTION OF THE DRAWINGS

FIG. 2 shows a method of mediating Diameter Credit Control Answers (CCA) with reauthorization functionality in a CAMEL network, according to an embodiment of the invention.

DETAILED DESCRIPTION

Figure 1A:
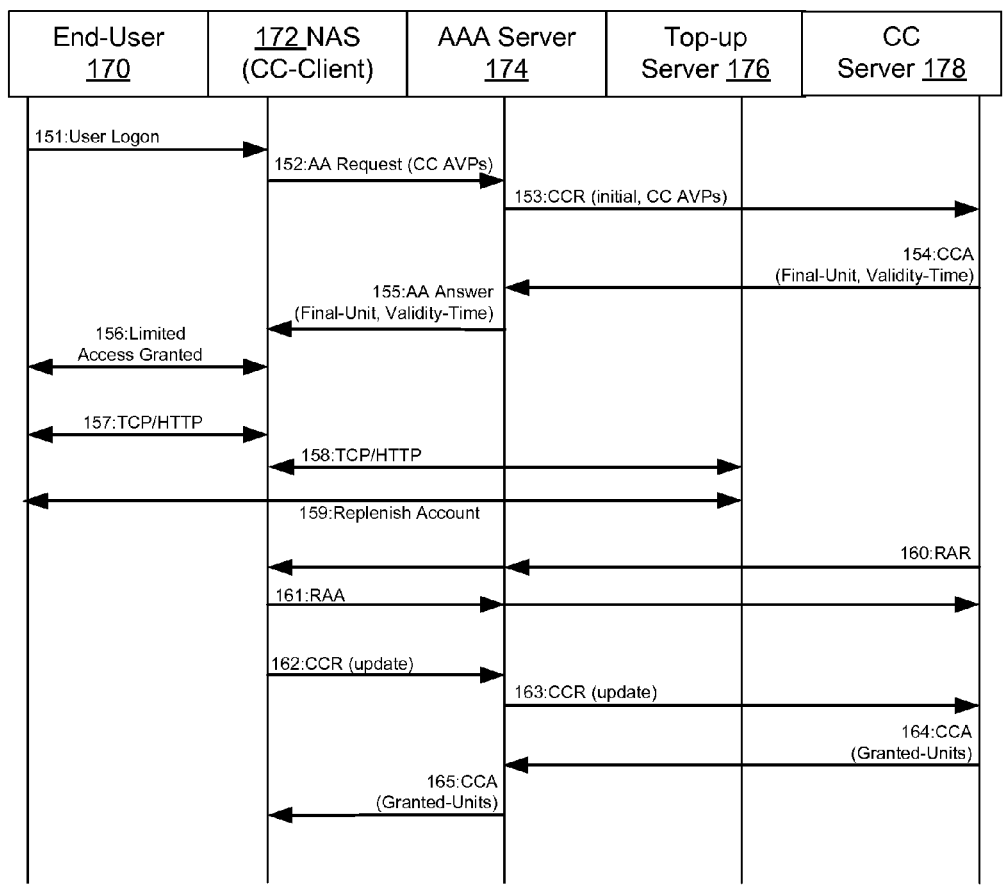
FIG. 1A shows the standard sequence diagram for redirection of the Diameter Credit Control Application (Prior Art).

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the Figures and detailed description; therefore, reference numerals used in a Figure may or may not be referenced in the detailed description specific to such figure if the element is described elsewhere. The first digit in a three digit reference numeral indicates the series of Figures in which the element first appears.

Although the Figures depict components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

The Diameter Credit Control Application is specified in RFC 4006. It can be used to provide real-time credit control for various applications, including, for example, messaging services, gaming services, video services, etc. The Application is used between the network element providing the service (client) and a credit control server. Redirection of sessions is used by Diameter Credit Control Applications (DCCA-RFC 4006) as a means to redirect a user to a different destination to engage with additional services. This includes, for example redirection to a service for adding additional credit to an account "top-up". Following redirection the credit control server uses reauthorization to force the network element to reauthorize credits.

FIG. 1A shows the standard sequence diagram for redirection and reauthorization of the Diameter Credit Control Application as specified in Appendix VIII of RFC4006. End User 170 sends a logon message 151 to Network Access Server (NAS) 172. In response NAS 172 sends an AA (Authentication and Authorization) Request 152 to AAA (Authentication, Authorization, and Accounting) Server 174. In response AAA Server 174 sends an initial CCR (Credit Control Request) message 153 to CC (Credit Control) Server 178. In response CC Server 178 sends a CCA (Credit Control Answer) message 154 to AAA Server 174. The CCA message carries the result of the corresponding credit control request. As illustrated, End User 170 does not have enough credits in the CC Server 178. Thus CC server 178 is redirecting the End User to the Top-up Server 176 by including in the CCA response 154 the Final-unit parameter.

Top-up Server 176 provides a mechanism by which End-User 170 can add to the credits available from CC Server 178. In response to the Final-unit parameter, End-User 170 interacts 157 with NAS 172 using the selected mechanism (e.g. TCP/HTTP) and is redirected 158 to Top-up server 176. End-User 170 can the interact 159 with Top-up Server 176 to replenish the account e.g. add more funds, credits, time etc.

Subsequent to the top-up transaction. CC Server 178 transmits a RAR (Re-Auth-Request) message 160 via AAA Server 174 to NAS 172. The purpose of the RAR message is to trigger a new CCR after e.g. a successful replenishment of credit using a top-up transaction. NAS 172 responds with a RAA (Re-Auth-Answer) message. In response NAS 172 sends an update CCR request 162 to AAA Server 174. In response AAA Server 174 sends an update CCR request 163 to CC Server 178. In response CC Server 178 sends a CCA response 164 to AAA Server 174 reflecting the granted units including units added during the top-up transaction. In response AA Server 174 sends a CCA response 165 to NAS 172 reflecting the granted units including units added during the top-up transaction.

However, as described above, in a CAMEL network, there is no support for transmitting a reauthorization message, similar to the RAR 160. Accordingly, MSC similar to the NAS 172, may not be triggered to send an ApplyCharging-Response, similar to the initiate CCR update 162 after the top-up operation. Accordingly, the End User 170 is denied authorization for the service accessed at the expiration of the credits granted prior to the top-up operation. The credits obtained during the top-up operation are unrecognized in the current session. Thus, the session is terminated and the End User 170 is denied access to the service in the current session. This is disruptive to the End User.

As described above, CAMEL systems do not include the capability to support reauthorization. In an embodiment of the invention an online mediation system includes a charging module to provide the added functionality to CAMEL systems. The online mediation system uses the charging module to control ApplyCharging/ApplyChargingReports sent to the MSC and control CCR/CCA, RAR/RAA sent to the online charging system to provide reauthorization functionality.

Figure 1B:
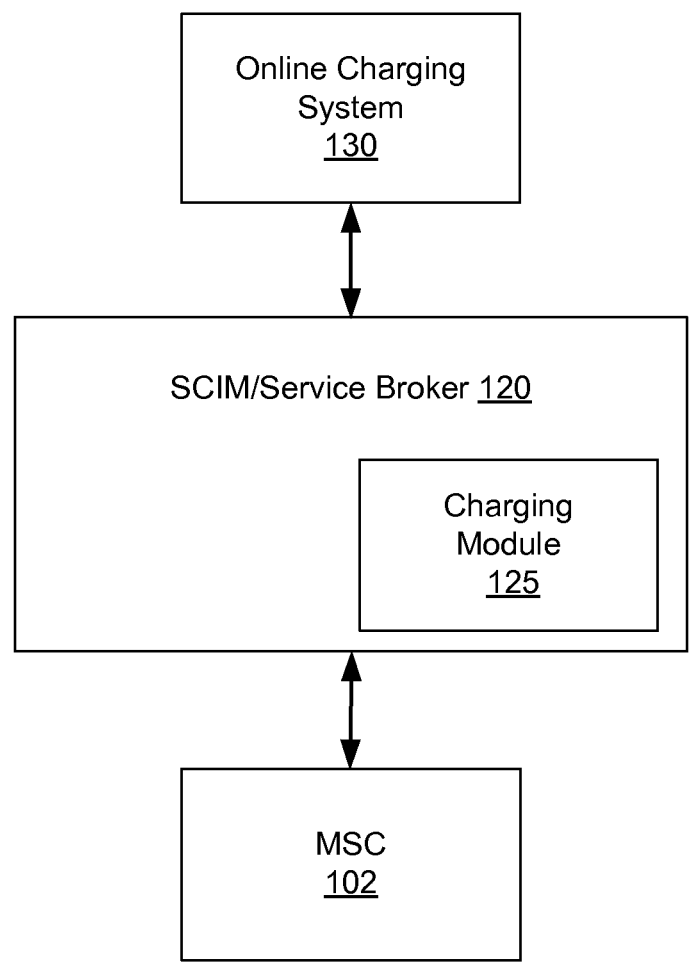
FIG. 1B shows an enhanced mediation system including charging module functionality according to an embodiment of the invention.

FIG. 1B shows an a SCIM (Service Capability Interaction Manager) 120 including a Charging Module 125 to provide enhanced charging capabilities in accordance with an embodiment of the invention. SCIM 120 communicates with a network's Mobile Switching Centre (MSC) 102. SCIM 120 communicates with the MSC using e.g. Camel Application Part protocol and communicates with the OCS using e.g. Diameter Ro protocol. SCIM 120 supports a flexible charging infrastructure which maximizes existing charging components while introducing new services that may have unique charging requirements that span multiple charging systems. Unified mediation pulls charging operations together, allowing a single charging strategy to be applied across networks and business groups.

As illustrated in FIG. 1B, SCIM 120 provides the ability to combine the service logic of multiple services and deliver the combined services to sessions in the network. In an embodiment of the present invention SCIM 120 includes a Charging Module 125. Charging Module 125 allows SCIM 120 to interactively provide reauthorization functionality to CAMEL networks. Charging Module 125 is in some embodiments a separate entity activated by SCIM 120. The functionality of Charging Module 125 is alternatively built-in to the logic of SCIM 120.

Charging Module 125 allows support for reauthorization under the following conditions:
1. The service that is requested (service-id/rating-group etc.) is the same for the full duration of a session (in most common services voice, data this is true);
2. The RAR/RAA are initiated following a positive update to the account (recharge/topup) that does not change a session section charging; and
3. The allocated units are non monetary (CC-Money) of type time/octects/specific-service (CC-Time, CC-XXX-Octets, CC-Service-Specific-Units).

The reauthorization functionality is controlled by two variables:

1. OCS-request: the requested units (RSU) a Service Broker will request from an OCS in a CCR; and
2. Network-allocation: the allocated units set in an ApplyCharging request sent to the MSC ocs_request>=network-allocation.

FIG. 2 shows a method of mediating Diameter Credit Control Answers (CCA) with reauthorization functionality in a CAMEL network, according to an embodiment of the invention. When a subscriber starts to make a call, this request is received by a network's Mobile Switching Centre (MSC). The MSC sends an InitialDetectionPoint (initialDP) Message which is received by the Online Mediation Controller/SCIM at step 200. At step 210 the sessionTerminated flag is set to false. Step 220 shows the method steps performed while the session is open (i.e. sessionTerminated flag is false).

At step 221 the Charging Module sends a Ro Credit Control Request (CCR) to the OCS. The used service units is set to the total_used_units. At step 222, the Charging Module receives a Credit Control Answer (CCA) from the OCS. At step 223, if the CCA result code=2XXX, the Charging Module extracts the granted_service_units from the CCA and sets the total_used_units to zero.

At step 224, Charging Module checks that the granted_service_units are less than the total_used_units and that the session is not terminated. The Charging Module then at step 225 sends a CAMEL Apply Charging/Apply Charging GPRS to the network with a credit allocation equal to the lesser of network-allocation or (granted_service_units−total_used_units). That is the Charging Module provides a credit allocation that is equal to the network-allocation variable or less (if there is less credit available). At step 226, Charging Module waits for the next event.

At step 227a, if the next event is the receipt of an RAR from the OCS the Charging Module: 1.) sends an RAA to the OCS, 2.) sends a CCR to the OCS reflecting the total_used_units; 3.) receives a CCA from the OCS; and 4.) extracts the granted_service_units from the CCA and resets the total_used_units to zero. At step 227b, if the next event is ApplyChargingReport/ApplychargingReportGPRS, the Charging Module: 1.) adds the reported usage to the total_used_units; and 2.) if the session is terminated sets the the sessionTerminated flag to true. At step 230, if the session terminated flag is set to true, and an OCS session is open, the Charging Module sends a CCR terminate identifying the total_used_units as the used service units.

The method of FIG. 2A ensures that, in response to an RAR, an RAA and an immediate CCR update will be generated (step 227 item 1). In the CCR generated following an RAR the difference between the reported usage and the actual usage will be limited by the network_allocation variable (step 227 item 2). This is guaranteed because the method reports the accumulated usage amount up to the closest allocation usage. The method assumes that the last allocation usage is zero at the point of report. The method assumes that following an RAR enough granted service units will be returned to accommodate for the active "open" allocation on the network, thus in step 227 item 4 the returned CCA will always be positive (this is listed as one of the conditions for using this method).

The two method variables (OCS_Request and Network_Allocation) allow a tradeoff between: 1. The number/frequency of interactions between SCIM and the OCS (increasing the ocs_request will allow the SCIM to use a larger "buffered" value); and 2. The allocation toward the network (network-allocation, provides a tradeoff between the accuracy of the reported amount after an RAR and between the amount of traffic between the SCIM and the MSC). A small value of network-allocation will assure that the reported status after an RAR will be very close to the real usage, yet will entail a lot of traffic between SCIM and the MSC. A high value will entail a much smaller interaction between SCIM and MSC, yet will mean that following an RAR the difference between the reported usage compared to the real usage may be much larger.

Figure 3A:
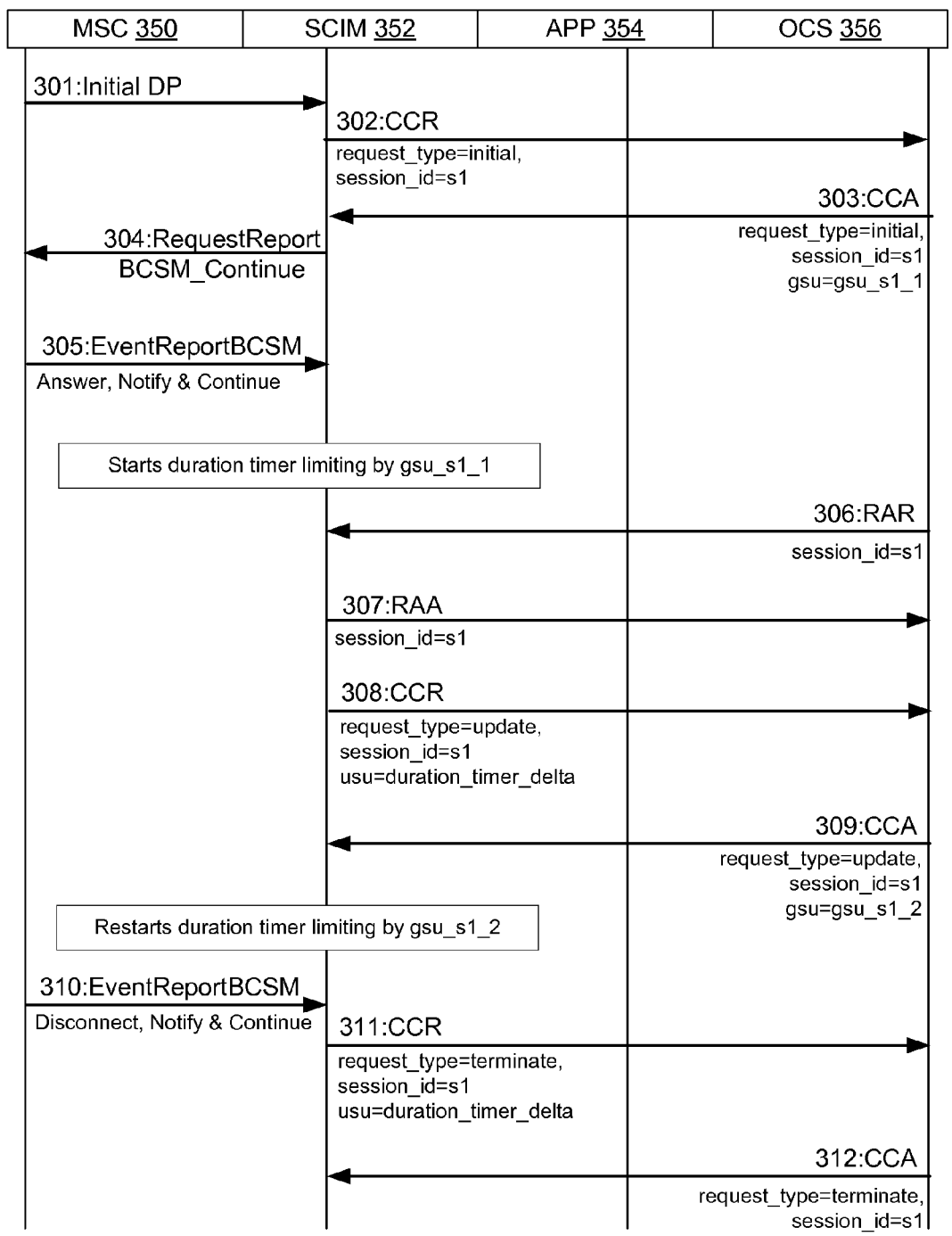
FIGS. 3A-3C show sequence diagrams illustrating charging module functionality according to embodiments of the invention.
Figure 3B:
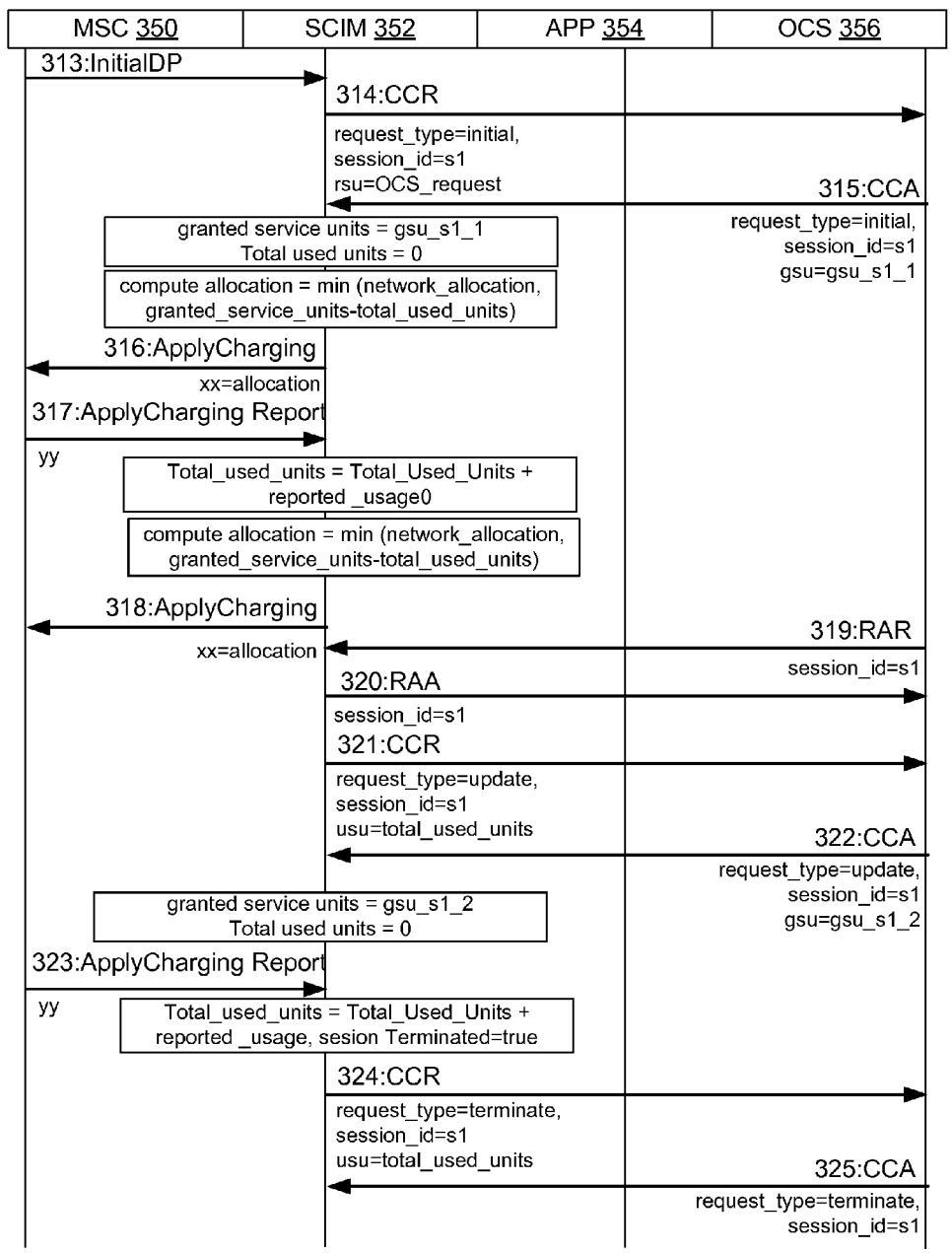
Figure 3C:
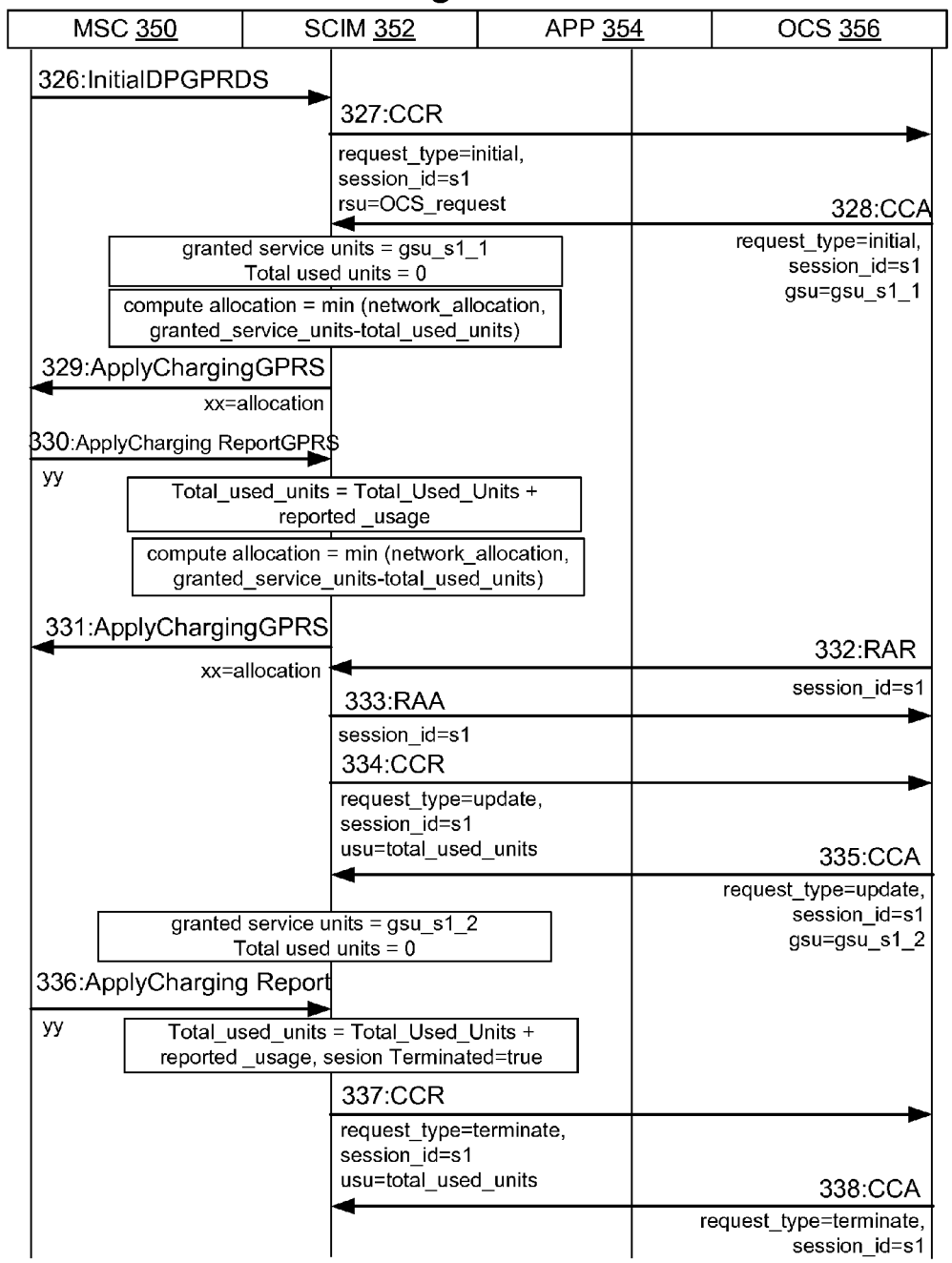

FIGS. 3A-3C show sequence diagrams illustrating mediation of reauthorization functionality according to embodiments of the invention. In the sequence diagrams of FIGS. 3A-3C SCIM 352 includes-charging functionality which allows it to mediate charging between Mobile Switching Center (MSC) 350 and Online Charging Service (OCS) 356. MSC 350 communicates with SCIM 352 using CAMEL Application Part (CAP) signaling protocol whereas SCIM 352 communicates with OCS 356 using Diameter Ro signaling protocol.

Referring first to FIG. 3A which shows a sample sequence diagram for charging of a voice session featuring a SCIM using internal charging and supporting an RAR request being generated by an OCS. Steps 301-305 show the establishment of the voice session. At step 301, MSC 350 sends an initialDP request to SCIM 352. At step 302, SCIM 352 sends an initial CCR to OCS 356 opening a session s1 with OCS 356. At step 303, OCS 356 responds to SCIM 352 with a CCA granting service units in the amount gsu-s1_1 . At step 304, SCIM 352 sends a RequestReportBCSM to MSC 350. At step 305, MSC 350 sends an EventReportBCSM to SCIM 352—Answer Notify & Continue. SCIM 352 starts a duration timer limited by the granted service units gsu_s1_1.

Steps 306-309 show the response of SCIM 352 to a RAR message from OCS 356. At step 306, OCS 356 transmits a RAR to SCIM 352. At step 307, responds to OCS 356 with an RAA. At step 308, SCIM 352 sends an update CCR where the total used units reflect the duration timer delta. At step 309, in response, SCIM 352 sends a CCA granting service units in the amount gsu_s1_2. SCIM 352 starts a duration timer limited by the granted service units gsu_s1_2.

Steps 310-312 show the response of SCIM 352 upon disconnection of the call. At step 310, when the call is disconnected, MSC 350 sends an EventReportBCSM to SCIM 352—Disconnect, Notify and Continue. In response, at step 311 SCIM 353 sends a CCR terminate message to the OCS reporting used units based on the timer delta. In response, at step 312, OCS sends a CCA and terminates session s1.

Referring next to FIG. 3B which shows a sample sequence diagram for a voice session being controlled by a SCIM using the method of FIG. 2 using External Charging and supporting OCS RAR. Steps 313-316 show the establishment of the voice session. At step 313, MSC 350 sends an InitialDP request to SCIM 352. At step 314, SCIM 352 sends an initial CCR to OCS 356 opening a session s1 with OCS 356. At step 315, OCS 356 responds to SCIM 352 with a CCA granting service units in the amount gsu-s1_1. At this point granted service units equal gsu_s1_1 and the total_used_unit is zero. The SCIM computes the allocation based on the smaller of the network allocation variable or granted_service_units−total_used_units). Typically the granted service units exceed the network allocation and so the SCIM will compute the allocation using the network allocation variable at this point. At step 316, SCIM transmits an ApplyCharging message to MSC 350 with the calculated allocation.

As the call progresses, MSC 350 sends charging reports to SCIM 352 reflecting usage—step 317. In response to receiving charging reports, SCIM 352, at step 318 adjusts the total_used_units variable to reflect the usage, recomputes a new allocation, and transmits an ApplyCharging message to MSC 350 reflecting the recomputed allocation. Again, the SCIM computes the allocation based on the smaller of the network allocation variable or granted_service_units−total_used_units.

Steps 319-322 show the response of SCIM 352 to a RAR message from OCS 356. At step 319, SCIM 352 receives a RAR message from OCS 356. At step 320, SCIM 352 responds to OCS 356 with a RAA message. At step 321 SCIM 352 then sends an update CCR message to OCS 356. The update CCR reflects the total used units accumulated in the previous steps. At step 322, SCIM 352 receives a CCA with a new allocation of granted_service_units gsu_s1_2 from OCS 356. At this point, granted service units are gsu_s1_2 and total_used_units is reset to zero (the prior used units having already been charged to OCS 356).

Steps 323-325 show the response of SCIM 352 to an ApplyChargingReport from MSC 350 upon termination of the call. At step 323, SCIM 352 receives an ApplyChargingReport message from MSC 350 reflecting yy usage. SCIM 352 adds the reported yy units to the total_used_units variable and sets the sessionTerminated flag to true. At step 324, SCIM 352 sends a CCR terminate message to OCS 356. The CCR message reflects the accumulated total_used_units (those units not already charged to the OCS). In response, at step 325, OCS sends a CCA message and terminates session s1.

Referring next to FIG. 3C which shows a sequence diagram of a GPRS data session being controlled by SCIM 352 using external charging and supporting OCS RAR. Steps 326-331 show the establishment of the data session. At step 326, MSC 350 sends an InitialDPGPRS request to SCIM 352. At step 327, SCIM 352 sends an initial CCR to OCS 356 opening a session s1 with OCS 356. At step 328, OCS 356 responds to SCIM 352 with a CCA granting service units in the amount gsu-s1_1. At this point granted_service_units equal gsu_s1_1 and the total_used_unit is zero. SCIM 352 computes an allocation based on the smaller of the network_allocation variable or granted_service_units−total_used_units. Typically the granted_service_units exceed the network_allocation and so the SCIM will compute the allocation using the network-allocation variable at this point. At step 329, SCIM transmits an ApplyChargingGPRS message to MSC 350 with the calculated allocation xx.

As the data session progresses, MSC 350 sends ApplyChargingReportGPRS to SCIM 352 reflecting data usage—step 330. At step 331, in response to receiving charging reports, SCIM 352 adjusts the total_used_units variable to reflect the usage, recomputes a new allocation, and transmits an ApplyChargingGPRS message to MSC 350 reflecting the recomputed allocation. Again, the SCIM computes the allocation based on the smaller of the network allocation variable or granted_service_units−total_used_units.

Steps 332-335 show the response of SCIM 352 to a RAR message from OCS 356. At step 332, SCIM 352 receives a RAR message from OCS 356. At step 333, SCIM 352 responds to OCS 356 with a RAA message. At step 334 SCIM 352 then sends an update CCR message to OCS 356. The update CCR reflects the total_used_units accumulated in the previous steps. At step 335, SCIM 352 receives a CCA with a new allocation of granted service units gsu_s1_2 from OCS 356. At this point, granted_service_units are gsu_s1_2 and total_used_units is reset to zero (the prior used units having already been charged to OCS 356).

Steps 336-338 show the response of SCIM 352 to an ApplyChargingReportGPRS from MSC 350 upon termination of the data session. At step 336, SCIM 352 receives an ApplyChargingReportGPRS message from MSC 350 reflecting yy usage. SCIM 352 adds the reported yy units to the total_used_units variable and sets the sessionTerminated flag to true. At step 337, SCIM 352 sends a CCR terminate message to OCS 356. The CCR message reflects the accumulated total_used_units (those units not already charged to the OCS). In response, at step 338, OCS sends a CCA message and terminates session s1.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for supporting reauthorization functionality in a CAMEL network, the method comprising:
  receiving at a Service Capability Interaction Manager (SCIM) an Initial Detection Point/Initial Detection Point General Packet Radio Service (InitialDP/InitialDPGPRS) request over the CAMEL network from a mobile switching center (MSC) related to a requested service;
  sending an initial Credit Control Request (CCR) from the SCIM to an Online Charging System (OCS) establishing a session for the requested service;
  receiving a Credit Control Answer (CCA) at the SCIM from the OCS granting an initial granted number of units;
  calculating with the SCIM an initial allocation of units comprising some of the initial granted number of units;
  sending an ApplyCharging/ApplyChargingGPRS message from the SCIM to the MSC with the initial allocation of units;

receiving, in response to a top-up transaction, a Re-Authorization Request (RAR) message at the SCIM from the OCS;

sending a Re-Authorization Response (RAA) message from the SCIM to the OCS;

sending a CCR update message from the SCIM to the OCS charging the units of the a used units counter in the SCIM to the OCS;

receiving a CCA at the SCIM from the OCS granting a new granted number of units; and resetting the used units counter in the SCIM to zero;

whereby, the new granted number of units recognizes units made available by the top-up transaction and whereby the SCIM is enabled to make a new allocation of units comprising some of the new granted number of units to the MSC over the CAMEL network thereby allowing the MSC to continue to provide the requested service in the same session.

2. The method of claim 1, wherein calculating the initial allocation of units comprises determining the lesser of lesser of a network-allocation variable and (initial granted units—the units of the used units counter).

3. The method of claim 1, further comprising:
receiving an ApplyChargingReport/ApplyChargingReportGPRS message from the MSC;
incrementing the used units counter in response to the ApplyChargingReport/ApplyChargingReportGPRS;
calculating a new allocation of units comprising some of the initial granted number of units; and
sending an ApplyCharging/ApplyChargingGPRS message to the MSC with a new allocation of units.

4. The method of claim 3, wherein:
calculating the new allocation of units comprises determining the lesser of lesser of a network-allocation variable and (initial granted units—the units of the used units counter).

5. The method of claim 1, further comprising:
sending a terminate CCR from the SCIM to the OCS upon termination from the network and charging the units of the used units counter to the OCS.

6. The method of claim 1, wherein communication between the SCIM and the MSC is conducted using Camel Application Part protocol.

7. The method of claim 1, wherein communication between the SCIM and the OCS is conducted using Diameter Ro protocol.

8. A non-transitory computer readable storage medium including instructions stored thereon for supporting reauthorization functionality in a CAMEL network, which instructions, when executed by a computer, cause the computer to perform steps comprising:
receiving at a Service Capability Interaction Manager (SCIM) an Initial Detection Point/Initial Detection Point General Packet Radio Service (InitialDP/InitialDPGPRS) request over the CAMEL network from a mobile switching center (MSC) related to a requested service;
sending an initial Credit Control Request (CCR) from the SCIM to an Online Charging System (OCS) establishing a session for the requested service;
receiving a Credit Control Answer (CCA) at the SCIM from the OCS granting an initial granted number of units;
calculating with the SCIM an initial allocation of units comprising some of the initial granted number of units;
sending an ApplyCharging/ApplyChargingGPRS message from the SCIM to the MSC with the initial allocation of units; receiving, in response to a top-up transaction, a Re-Authorization Request (RAR) message at the SCIM from the OCS;

sending a Re-Authorization Response (RAA) message from the SCIM to the OCS;

sending a CCR update message from the SCIM to the OCS charging the units of a used units counter in the SCIM to the OCS;

receiving a CCA at the SCIM from the OCS granting a new granted number of units; and resetting the used units counter in the SCIM to zero;

whereby, the new granted number of units recognizes units made available by the top-up transaction and whereby the SCIM is enabled to make a new allocation of units comprising some of the new granted number of units to the MSC over the CAMEL network thereby allowing the MSC to continue to provide the requested service in the same session.

9. The non-transitory computer readable storage medium of claim 8, wherein:
calculating the initial allocation of units comprises determining the lesser of lesser of a network-allocation variable and (initial granted units—the units of the used units counter).

10. The non-transitory computer readable storage medium of claim 8, including instructions stored thereon which, when executed by a computer, cause the computer to perform further steps comprising:
receiving an ApplyChargingReport/ApplyChargingReportGPRS report from the MSC;
incrementing the used units counter in response to the ApplyChargingReport/ApplyChargingReportGPRS;
calculating a new allocation of units comprising some of the initial granted number of units; and
sending an ApplyCharging/ApplyChargingGPRS message to the MSC with a new allocation of units.

11. The non-transitory computer readable storage medium of claim 10, wherein calculating the new allocation of units comprises determining the lesser of lesser of a network-allocation variable and (initial granted units—the units of the used units counter).

12. The non-transitory computer readable storage medium of claim 8, including instructions stored thereon which, when executed by a computer, cause the computer to perform a further step comprising:
sending a terminate CCR from the SCIM to the OCS upon termination and charging the units of the used units counter to the OCS.

13. The non-transitory computer readable storage medium of claim 8, wherein communication between the SCIM and with the MSC is conducted using Camel Application Part protocol.

14. The non-transitory computer readable storage medium of claim 8, wherein communication between the SCIM and the OCS is conducted using Diameter Ro protocol.

15. A system for supporting reauthorization functionality in a CAMEL network, the system comprising:
a Service Capability Interaction Manager (SCIM) wherein the SCIM is adapted to,
receive an Initial Detection Point/Initial Detection Point General Packet Radio Service (InitialDP/InitialDPGPRS) request over the CAMEL network from a mobile switching center (MSC) related to a requested service,
send an initial Credit Control Request (CCR) to an Online Charging System (OCS) establishing a session for the requested service, receive a Credit Control Answer (CCA) from the OCS granting an initial granted number of units, calculate an initial allocation of units comprising some of the initial granted number of units send an ApplyCharging/ApplyChargingGPRS message to the MSC with the initial allocation of units, receive, in response to a top-up transaction, a Re-Authorization Request (RAR) message from the OCS, send a Re-Authorization Response (RAA) message to the OCS, send a CCR update message to the OCS charging the units of a used units counter in the SCIM to the OCS, receive a CCA from the OCS granting a new granted number of units, and reset the used units counter in the SCIM to zero;

whereby, the new granted number of units recognizes units made available by the top-up transaction and whereby the SCIM is enabled to make a new allocation of units comprising some of the new granted number of units to the MSC over the CAMEL network thereby allowing the MSC to continue to provide the requested service in the same session.

16. The system of claim 15, wherein the SCIM is adapted to calculate the initial allocation of units by determining the lesser of lesser of a network-allocation variable and (initial granted units—the units of the used units counter).

17. The system of claim 15, wherein the SCIM is further adapted to:

receive an ApplyChargingReport/ApplyChargingReportGPRS from the MSC;

increment the used units counter in response to the ApplyChargingReport/ApplyChargingReportGPRS;

calculate a new allocation of units comprising some of the initial granted number of units; and send an ApplyCharging/ApplyChargingGPRS message to the MSC with a new allocation of units.

18. The system of claim 17, wherein the SCIM is adapted to calculate the new allocation of units by determining the lesser of lesser of a network-allocation variable and (initial granted units—the units of the used units counter).

19. The system of claim 15, wherein the SCIM is further adapted to:

send a terminate CCR to the OCS upon termination charging the units of the used units counter to the OCS.

20. The system of claim 15, wherein the SCIM communicates with the MSC using Camel Application Part protocol and communicates with the OCS using Diameter Ro protocol.

* * * * *